(12) United States Patent
Goka et al.

(10) Patent No.: US 8,756,989 B2
(45) Date of Patent: Jun. 24, 2014

(54) FLOW MEASURING DEVICE

(75) Inventors: Yasushi Goka, Kariya (JP); Takashi Enomoto, Anjo (JP); Noboru Kitahara, Kariya (JP)

(73) Assignee: Denso Corporation, Kariya (JP)

( * ) Notice: Subject to any disclaimer, the term of this patent is extended or adjusted under 35 U.S.C. 154(b) by 299 days.

(21) Appl. No.: 13/281,678

(22) Filed: Oct. 26, 2011

(65) Prior Publication Data

US 2012/0103086 A1 May 3, 2012

(30) Foreign Application Priority Data

Oct. 28, 2010 (JP) .................................. 2010-241692

(51) Int. Cl.
*G01F 1/68* (2006.01)

(52) U.S. Cl.
USPC ....................................................... 73/204.26

(58) Field of Classification Search
USPC ................. 73/204.26, 204.22, 204.23, 204.24
See application file for complete search history.

(56) References Cited

U.S. PATENT DOCUMENTS

| | | | |
|---|---|---|---|
| 6,871,534 B1 | 3/2005 | Hamada et al. | |
| 6,952,961 B2 * | 10/2005 | Kawai et al. | 73/204.22 |
| 7,051,589 B2 * | 5/2006 | Igarashi et al. | 73/202.5 |
| 7,530,267 B2 * | 5/2009 | Uramachi | 73/202.5 |
| 2001/0037678 A1 * | 11/2001 | Kamiya | 73/204.22 |
| 2003/0019289 A1 * | 1/2003 | Ueyama et al. | 73/204.22 |
| 2003/0182998 A1 | 10/2003 | Goto et al. | |
| 2004/0237644 A1 * | 12/2004 | Igarashi et al. | 73/204.25 |
| 2005/0150290 A1 * | 7/2005 | Kawai et al. | 73/204.22 |
| 2005/0241386 A1 | 11/2005 | Goka et al. | |

FOREIGN PATENT DOCUMENTS

JP 2005-128038 5/2005

OTHER PUBLICATIONS

Japanese Office Action dated Sep. 18, 2012, issued in corresponding Japanese Application No. 2010-241692, with English translation.

* cited by examiner

*Primary Examiner* — Jewel V Thompson
(74) *Attorney, Agent, or Firm* — Nixon & Vanderhye P.C.

(57) ABSTRACT

A flow measuring device includes a housing, a support, and a flow measurement element. The housing defines a passage therein and includes a passage narrowing part, which reduces a cross-sectional area of the passage, in a predetermined part of the passage. The support has a platy shape and is disposed along a flow direction of fluid flowing in the passage. The flow measurement element is located inside the passage narrowing part and is disposed on a surface of the support. The flow measurement element detects a flow rate of fluid flowing in the passage. The passage narrowing part has an inner wall surface that gradually reduces a width of the passage from a center side to both end sides of the passage in a height direction of the passage, which is perpendicular to a direction of the width of the passage.

28 Claims, 8 Drawing Sheets

FLOW MEASURING DEVICE

CROSS REFERENCE TO RELATED APPLICATION

This application is based on and incorporates herein by reference Japanese Patent Application No. 2010-241692 filed on Oct. 28, 2010.

BACKGROUND OF THE INVENTION

1. Field of the Invention

The present invention relates to a flow measuring device that includes a flow measuring element, such as a heater resistive element or a sensing resistive element, disposed on a surface of its support attached to a housing.

2. Description of Related Art

A conventional technology will be described below. Conventionally, an air flow measuring device including an air flow meter detachably attached to an attaching hole of an intake pipe is public knowledge. The intake pipe defines an intake air passage of an internal combustion (engine). The air flow meter includes, as illustrated in FIG. 10, a sensor body 101, a sensor support 102, and an air flow sensor. The sensor body 101 is attached such that the sensor body 101 projects into the intake pipe. The sensor support 102 is disposed inside the sensor body 101. The air flow sensor is mounted on a surface of the sensor support 102.

The sensor body 101 includes a first bypass passage 104 and a second bypass passage 105. The first bypass passage 104 takes in a part of intake air flowing in the intake air passage defined by the intake pipe. The second bypass passage 105 takes in a part of the intake air flowing in the first bypass passage 104. At an outlet of the first bypass passage 104, a passage narrowing part 106 is formed. The passage narrowing part 106 has a tapered shape and gradually decreases a cross-sectional area of the first bypass passage 104 in a flow direction of the intake air through the first bypass passage 104. Between an inlet of the second bypass passage 105 and an outlet of the second bypass passage 105, a sensor locating part 107, where the air flow sensor is placed, is provided.

The air flow sensor outputs an electrical signal in accordance with an air flow rate of the second bypass passage 105 and includes a sensor chip 108, a flow measurement element (sensing element) 109, and a controller 110. The sensor chip 108 includes a flat-plate silicon substrate. The flow measurement element (sensing element) 109 is composed of a thin-film resistive element on a surface of the sensor chip 108. The controller 110 processes the electrical signal outputted from the sensing element 109 and outputs an electrical signal to an electronic control unit (ECU). The sensor chip 108 is mounted on a sensor chip mounting area of the sensor support 102. The sensing element 109 is composed of the thin-film resistive element (e.g., a heat generating resistive element or an air temperature detecting resistive element) arranged in a predefined pattern on the surface of the sensor chip 108.

The controller 110 includes a flow detecting circuit which outputs an electrical signal (sensor output signal) in accordance with change of resistance of the thin-film resistive element composing the sensing element 109. The controller 110 further includes a temperature controlling circuit which controls a heating current flowing in the heat generating resistive element such that a temperature of the heat generating resistive element becomes higher by a constant temperature than a surrounding air temperature detected at the air temperature detecting resistive element. When a passage narrowing part is not formed in the sensor locating part 107 of the second bypass passage 105 (see FIG. 11A), exfoliation or turbulence of an air flow into the sensor locating part 107 occurs. In this case, the sensor output signal fluctuates and a measuring error is observed in an air flow measurement value. For this reason, a defect of reduction in air flow measurement accuracy occurs.

The air flow measuring device is public knowledge (see, e.g., Patent Document 1 (JP4140553 corresponding to US2005/0241386 A1) and Patent Document 2 (JP4026660 corresponding to US2003/0182998 A1)). This air flow measuring device improves the measurement accuracy of the air flow measuring device by forming a passage narrowing part 121 or 122 in the sensor locating part 107 of the second bypass passage 105 as shown in FIG. 11B and FIGS. 12A to 12C for the purpose of an attempt to limit the output fluctuation of the sensing element 109 due to the exfoliation or the turbulence of the air flow. The passage narrowing parts 121 and 122 gradually decrease a cross-sectional area of the second bypass passage 105 two-dimensionally or three-dimensionally in an air flow direction of the second bypass passage 105. Because the air flow measuring device includes the two-dimensionally narrowed-shaped passage narrowing part 121 and the three-dimensionally narrowed-shaped passage narrowing part 122 in the sensor locating part 107 of the second bypass passage 105, the output fluctuation due to the exfoliation or the turbulence of the air flow can be limited and the occurrence of the measuring error can be suppressed.

A defect of the conventional technology will be described below. The air flow measuring device described in Patent Documents 1 and 2 has a problem as follows. The output fluctuation of the sensing element 109 due to the exfoliation or the turbulence of the air flow can be suppressed by forming the two-dimensionally narrowed-shaped passage narrowing part 121 or the three-dimensionally narrowed-shaped passage narrowing part 122. However, because the cross-sectional area of the sensor locating part 107 of the second bypass passage 105 is remarkably small, flow resistance and pressure loss increase. Hence, an air flow rate (air flow velocity) in the sensor locating part 107 decreases when an air flow rate of the intake air passage is low, and a flow-rate measuring range narrows. Accordingly, the limitation of the output fluctuation of the sensing element 109, and expansion of the flow-rate measuring range are in a trade-off relationship.

In recent years, there is demand for making the engine idle even less than the existing technology for a purpose of high fuel efficiency. In this case, a wide flow-rate measuring range from a high flow rate to an extremely low flow rate is necessary, but in the air flow measuring device described in Patent Documents 1 and 2, the expansion of the air flow measuring range to the low air flow rate region is limited. Moreover, in an air flow measuring device according to Patent Document 3 (JP2005-128038A), along the entire passage of a bypass passage through which a part of a main air flow of an intake air passage of an engine flows, from an inlet to an outlet of the bypass passage, an outer circumferential wall surface of the bypass passage located between wall surfaces on both sides of the bypass passage in a width direction is formed into a semicircle-shaped recessed curved surface, or this outer circumferential wall surface is alternatively formed into an inclined surface on its one side, or this outer circumferential wall surface is formed into two inclined surfaces on its both sides. In the air flow measuring device disclosed in Patent Document 3 (JP2005-128038A), because the outer circumferential wall surface of the entire bypass passage has the above-described shape, limitation of output fluctuation of a sensing element is possible, but the limitation of the output fluctuation of the sensing element and expansion of a flow-rate measuring range are incompatible.

SUMMARY OF THE INVENTION

The present invention addresses at least one of the above disadvantages.

According to the present invention, there is provided a flow measuring device including a housing, a support, and a flow measurement element. The housing defines a passage therein and includes a passage narrowing part, which reduces a cross-sectional area of the passage, in a predetermined part of the passage. The support has a platy shape and is disposed along a flow direction of fluid flowing in the passage. The flow measurement element is located inside the passage narrowing part and is disposed on a surface of the support. The flow measurement element is configured to detect a flow rate of fluid flowing in the passage. The passage narrowing part has an inner wall surface that gradually reduces a width of the passage from a center side to both end sides of the passage in a height direction of the passage, which is perpendicular to a direction of the width of the passage.

According to the present invention, there is also provided a flow measuring device including a housing, a support, and a flow measurement element. The housing defines a passage therein and includes a passage narrowing part, which reduces a cross-sectional area of the passage, in a predetermined part of the passage. The support has a platy shape and is disposed along a flow direction of fluid flowing in the passage. The flow measurement element is located inside the passage narrowing part and is disposed on a surface of the support. The flow measurement element is configured to detect a flow rate of fluid flowing in the passage. The passage narrowing part has an inner wall surface that gradually reduces a width of the passage in one of: a direction from a center side to an end side of the passage along a height direction of the passage, which is perpendicular to a direction of the width of the passage; and a direction from one end side to the other end side of the passage along the height direction of the passage.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
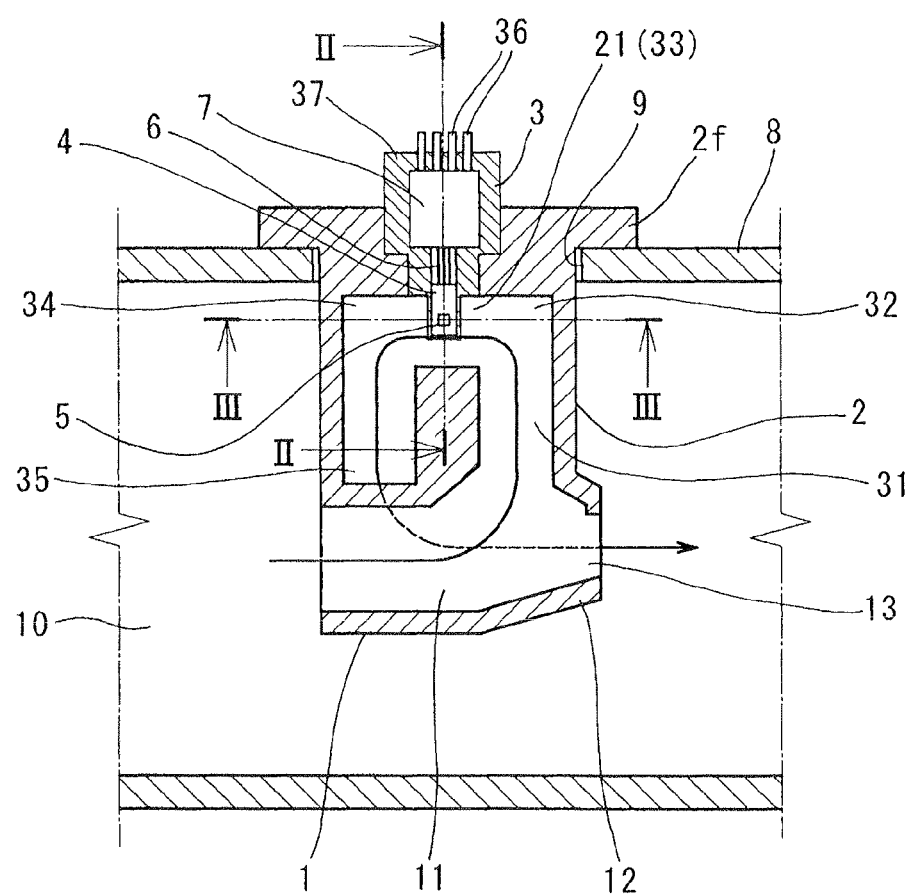
FIG. 1 is a sectional view illustrating a state in which an air flow meter (AFM) is attached to an intake pipe in accordance with a first embodiment of the invention.

Embodiments of the invention will be described below precisely in reference to drawings. In order to decrease fluctuation of output from a flow measurement element (a sensing element of a flow-rate sensor: a flow detecting part composed of a heat generating resistive element and a thermosensing resistive element which are arranged on a flat-plate substrate surface) disposed on a surface of a support and to expand a flow-rate measuring range to a low flow rate region more than the existing situation, a passage narrowing part is provided. The passage narrowing part has an inner wall surface which gradually reduces a width of a passage from a center side to both end sides of the passage in a height direction of the passage, or has an inner wall surface which gradually reduces the width of the passage from the center side or one end side to the other end side of the passage in a height direction of the passage.

First Embodiment

A configuration of a first embodiment will be described below. FIGS. 1 to 4B show the first embodiment.

A controlling device (engine controlling system) of an internal combustion according to the first embodiment includes an air flow measuring device which measures (calculates) a flow rate (air flow rate) of intake air supplied to a combustion chamber of the internal combustion (engine) having cylinders. The air flow measuring device includes a heat generating resistance type air flow meter (a flow rate sensor module or a thermal type air flow meter: hereinafter referred to as an air flow meter or an AFM) and an engine controlling unit (an engine controlling device: hereinafter referred to as an ECU). The AFM outputs an electrical signal in accordance with the flow rate of the intake air flowing in the intake pipe of the engine. The ECU measures (calculates) a flow rate or a flow velocity of air suctioned into the combustion chamber of each cylinder of the engine based on the electrical signal (sensor output signal $V_{out}$) outputted from the AFM.

The ECU includes a widely-known microcomputer composed of a central processing unit (CPU) or a storage device (a memory such as a read only memory (ROM) or a random access memory (RAM)). The CPU carries out arithmetic processing or controlling processing. The storage device stores a controlling program, controlling logic, or different types of data. The ECU computes (calculates) a value of the air flow rate based on the sensor output signal $V_{out}$ outputted from the AFM, and applies the calculated value of the air flow rate to engine control (e.g., air-fuel ratio control or fuel injection control). The ECU detects not only the air flow rate but also a flow direction of the intake air based on the sensor output signal $V_{out}$ outputted from the AFM. In the engine control, for example, an amount of fuel injected and supplied into the engine is calculated based on the detected value of the air flow rate. Depending on the calculated fuel-injection amount, an energization time (valve opening time) of an injector is variably controlled.

A gasoline-powered engine having cylinders is adopted as the engine in the present embodiment. The engine produces power from thermal energy obtained by burning mixture gas in the combustion chamber. The mixture gas is a mixture of fuel and clean external air (intake air) filtered through an air filter of an air cleaner. Intake ports of the engine for their respective cylinders are connected to the intake pipe. Inside the intake pipe, an intake air passage (fluid flow passage) for supplying the intake air to the combustion chamber of each cylinder of the engine is defined. Exhaust ports of the engine for their respective cylinders are connected to an exhaust pipe. Inside the exhaust pipe, there is an exhaust air passage for discharging exhaust gas, which flows out from the combustion chamber of each cylinder of the engine, into the outside through an exhaust purification system.

The AFM is detachably attached to the intake pipe in a plug-in system. The AFM includes a synthetic-resin sensor body (a first block 1 and a second block 2) constituting a hollow module housing (housing), a sensor support (support) 3 disposed inside the sensor body, and an air flow sensor mounted on a surface of the sensor support 3. The air flow sensor includes a sensor chip 4, a flow detecting part (a flow measurement element: hereinafter referred to as a sensing element 5), and a controller 7. The sensor chip 4 is mounted on a sensor chip mounting area of the sensor support 3. The flow detecting part is composed of a thin-film resistive element on a surface of the sensor chip 4. The controller 7 is electrically connected to a group of electrode pads through several bonding wires 6. The group of electrode pads is disposed on a longitudinal end part (upper end part in FIG. 1) of the sensor chip 4.

The AFM includes the sensor body detachably attached to an attaching hole 9 which is formed at a predetermined position in the intake pipe of the engine, specifically of a duct 8 of an air cleaner case. The sensor body extends through the attaching hole 9 formed on the predetermined position of the intake pipe and is inserted into the intake pipe from the outside of the intake pipe such that the sensor body projects into the intake air passage (main passage 10). The sensor body includes the straight pipe-shaped first block (hereinafter referred to as a block) 1, a hood wall part (not shown), and a second block (hereinafter referred to as a block) 2. The block 1 extends parallel to a flow direction of the intake air flowing in the main passage 10. The hood wall part covers both sides of the block 1 in its width direction. The block 2 is located at upper part of the block 1 in FIG. 1. Moreover, in the sensor body, specifically at an upper part of the block 2 in FIG. 1, a flange 2f is integrally formed with the block 2. The flange 2f is fastened and fixed to a rim part (outer wall surface) of an opening of the attaching hole 9 formed on the duct 8 by a fastening screw and so on.

The block 1 defines a first bypass passage (hereinafter referred to as a bypass passage) 11. A part of the intake air flowing in the intake air passage of the intake pipe of the engine (in the intake air passage of the internal combustion) flows into the bypass passage 11. The bypass passage 11 is defined parallel to the flow direction of the intake air flowing in the intake air passage of the intake pipe, and is an air flow passage (straight flow passage) bypassing the intake air passage of the intake pipe. At an upstream end of the bypass passage 11 in the flow direction of the intake air flowing in the intake air passage, an inlet is provided. The intake air flows into the inlet from the intake air passage of the intake pipe. At a downstream end of the bypass passage 11 in the flow direction of the intake air flowing in the intake air passage, an outlet is provided. The intake air flows out from the outlet to the intake air passage of the intake pipe. The block 1 or the bypass passage 11 includes a first passage narrowing part (hereinafter referred to as a passage narrowing part) 12 near the outlet of the bypass passage 11. The passage narrowing part 12 gradually decreases (reduces) a cross-sectional area of the bypass passage 11 in a flow direction of the intake air flowing in the bypass passage 11. The passage narrowing part 12 defines a narrowing-shaped first narrowing passage (hereinafter referred to as a narrowing passage) 13. The narrowing passage 13 reduces the sectional area of the bypass passage 11 and is surrounded by the passage narrowing part 12.

The block 2 defines a second bypass passage (hereinafter referred to as a bypass passage (passage)) 21. A part of the intake air flowing in the bypass passage 11 flows into the bypass passage 21. The bypass passage 21 is an air flow passage (circling flow passage) bypassing the intake air passage of the intake pipe. The bypass passage 21 includes an inlet and outlets. The inlet branches on an upstream side of the narrowing passage 13 in the flow direction of the intake air flowing in the bypass passage 11. The outlets are provided on both sides of the bypass passage 11 in a width direction of the bypass passage 11 such that the bypass passage 11 is located between the outlets. The bypass passage 21 branches on an upstream side of the outlets in a flow direction of the intake air flowing in the bypass passage 21. The block 2 or the bypass passage 21, as shown in FIGS. 2A to 3B, includes a second passage narrowing part (hereinafter referred to as a passage narrowing part) 22 in a predetermined section of the bypass passage 21. The passage narrowing part 22 gradually decreases (reduces) a cross-sectional area of the bypass passage 21 in the flow direction of the intake air flowing in the bypass passage 21. The passage narrowing part 22 defines a second narrowing passage (hereinafter referred to as a narrowing passage) 23. The narrowing passage 23 narrows the cross-sectional area of the bypass passage 21 and is surrounded by the passage narrowing part 22.

Figure 4A:
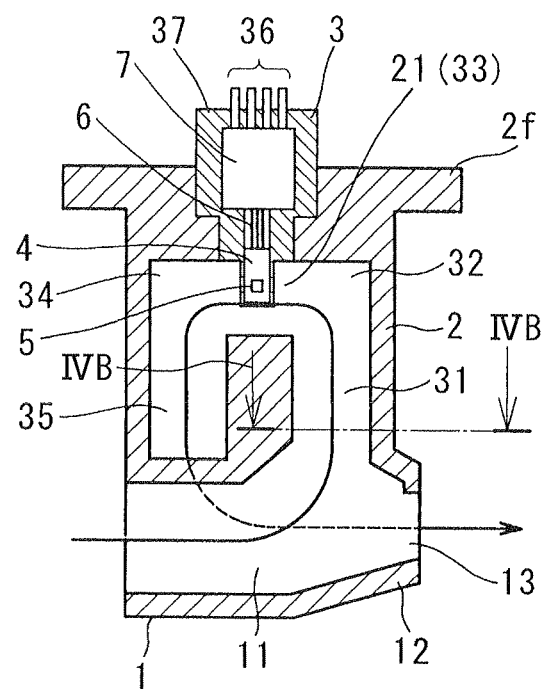
FIG. 4A is a sectional view illustrating the air flow meter in accordance with the first embodiment.
Figure 4B:
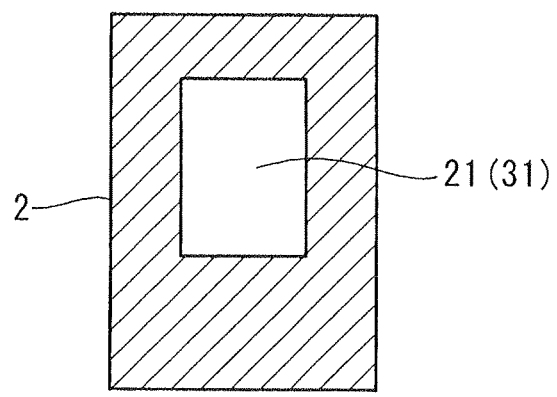
FIG. 4B is a sectional view taken along a line IVB-IVB of FIG. 4A in accordance with the first embodiment.

Between the inlet of the bypass passage 21 and the outlet of the bypass passage 21, a U-turn part in which the flow direction of the intake air flowing in the bypass passage 21 changes by 180 degrees (U-turns) is provided. The U-turn part includes a vertical passage part 31, a curved passage part 32, a passage connecting part (horizontal passage part) 33, a curved passage part 34, and a vertical passage part 35. The straight-shaped vertical passage part 31 branches from a branching part of the bypass passage 21 (the inlet of the bypass passage 21). The curved passage part 32 perpendicularly bends (changes) a flow direction of the intake air which has flowed out from the vertical passage part 31. The passage connecting part 33 connects to the curved passage part 32. The curved passage part 34 perpendicularly bends (changes) a flow direction of the intake air which has flowed out from the passage connecting part 33. The vertical passage part 35 guides the intake air which has flowed out from the curved passage part 34 toward the outlets of the bypass passage 21. The passage connecting part 33 composes an element locating part (sensor locating part, locating part) in which the air flow sensor, specifically the sensing element 5 is located. The bypass passage 21 with exclusion of the passage connecting part 33, in other words, the vertical passage part 31, the curved passage parts 32 and 34, and the vertical passage part 35 have a certain cross-sectional area in the flow direction of the intake air, as shown in FIGS. 4A and 4B, because the cross-sectional area surrounded by four flow passage wall surfaces (inner wall surface) of the block 2 is not narrowed. In the embodiment, the passage parts 31, 32, 34, 35 have rectangular cross-sections. The sensor body, specifically the passage narrowing part 22 of the block 2 will be hereinafter described in detail.

On the surface of the sensor support 3, the air flow sensor is mounted. Or the sensor support 3 contains and holds the air flow sensor in an inner space (sensor holding space) of the sensor support 3. The sensor support 3 is a protecting case made from an insulating resin. The sensor support 3 is inserted into the sensor body (such that the sensor support 3 is exposed to an inside of the passage connecting part 33) from an insertion opening formed in the block 2 of the sensor body to be held in the block 2. At an upper part of the sensor support 3 in FIG. 1, a connector housing 37 holding several terminals 36 is integrally formed with the sensor support 3. The terminal 36 electrically connects the air flow sensor and the ECU or a buttery (power source).

The air flow sensor includes the rectangle-shaped sensor chip 4 exposed to the intake air, the flow detecting part including a heater resistive element, and the controller 7 electrically connected to a wiring part on the sensor chip 4 through the bonding wire 6. The air flow sensor is mounted on the surface of the sensor support 3 or is contained and held (supported) in the sensor holding space. On the longitudinal end part of the sensor chip 4 (a part excluding the flow detecting part), the group of electrode pads for electrically connecting the bonding wire 6 and the wiring part is disposed. The sensor chip 4 includes a flat-plate silicon substrate whose surface is parallel to a flow direction of the intake air flowing in a predetermined section (in the narrowing passage 23) of the bypass passage 21.

The silicon substrate is disposed such that both surfaces of the flat-plate silicon substrate are arranged perpendicular to an axial direction of an average flow of the intake air flowing in the narrowing passage 23 of the bypass passage 21 (to a flow direction of the intake air flowing in the narrowing passage 23). On the surface of the silicon substrate, the sensing element 5 is arranged in a predetermined pattern via an insulating film. On the sensor chip 4, a membrane (thin-walled part) is formed by etching the silicon substrate from a backside. The insulating film is, for example, an insulating support film made from silicon nitride, and is formed on the surface of the silicon substrate by a sputtering or a chemical vapor deposition (CVD) method.

The sensing element 5 composes the flow detecting part (flow measurement element) detecting the air flow rate, and includes the heater resistive element and an air temperature sensor resistive element. The heater resistive element is a thin-film heat generating resistive element which produces high heat by a heating current flowing in the heater resistive element. The thin-film heater resistive element is formed on a surface of the membrane of the sensor chip 4 by a vacuum deposition or a sputtering of platinum (Pt), polysilicon (Poly-Si), or a single crystal of silicon, for example. Therefore, the heater resistive element is a thin-film resistive element formed in a predetermined pattern on the surface of the membrane of the sensor chip 4. The heater resistive element is electrically connected to a group of electrode pads of the controller 7 through the bonding wire 6.

The air temperature sensor resistive element is a thermosensing resistive element (temperature sensor resistive element) whose resistance value changes depending on a surrounding temperature, and is a thin film of platinum (Pt), polysilicon (Poly-Si), or a single crystal of silicon formed by a vacuum deposition or a sputtering, similar to the heater resistive element. The air temperature sensor resistive element is a thin-film resistive element formed on the surface of the sensor chip 4 other than the membrane. The air temperature sensor resistive element is electrically connected to the group of electrode pads of the controller 7 through the bonding wire 6. Similar to the heater resistive element and the air temperature sensor resistive element, each thin-film wiring part of both the heater resistive element and the air temperature sensor resistive element is formed on the surface of the sensor chip 4 by a vacuum deposition or a sputtering of a metallic thin film or semiconducting thin film. At an end part of each wiring part of the sensor chip 4, the group of electrode pads is disposed. Each electrode pad of the group of electrode pads on the sensor chip 4 is electrically connected to the electrode pad of the controller 7 or a terminal of the controller 7 through the bonding wire 6. On a surface of the flow detecting part and the wiring part, an insulating protection film made from silicon nitride is provided for protecting the flow detecting part. Accordingly, connection reliability between the flow detecting part and the wiring part is assured.

The controller 7 includes a flat-plate silicon substrate. On a surface of an end part of the silicon substrate, the group of electrode pads is disposed. The end part faces to the sensor chip 4. The group of electrode pads is electrically connected to the electrode pad of the sensor chip 4 through the bonding wire 6. On the silicon substrate of the controller 7, a temperature controlling circuit of the heater resistive element and a flow detecting circuit of the AFM are mounted. The temperature controlling circuit of the heater resistive element controls electrical power (heating current) supplied to the heater resistive element, such that a temperature deviation between a heating temperature of the heater resistive element and an air temperature detected in the air temperature sensor resistive element becomes a constant value. Therefore, the temperature controlling circuit is an energization circuit controlling the heater resistive element with energization (electric current).

The heating temperature of the heater resistive element is determined based on the resistance value of the air temperature sensor resistive element, and controlled with energization by the temperature controlling circuit such that a temperature difference (ΔT) between the heating temperature and the surrounding temperature (an air temperature (intake air temperature) detected in the air temperature sensor resistive element) becomes a constant value. Specifically, in the case where the temperature difference (ΔT) is controlled at 150 degrees for example, when the surrounding temperature (intake air temperature) is at 20° C., the temperature of the heater resistive element is controlled with energization to become about 170° C. And when the surrounding temperature (intake air temperature) is at 40° C., the temperature of the heater resistive element is controlled with energization to become about 190° C. The flow detecting circuit of the AFM outputs a heat radiation amount to the ECU as the electrical signal. The heat radiation amount is an amount of heat released from the heater resistive element to air flowing around the heater resistive element. For example, the heater resistive element and the air temperature sensor resistive element are incorporated into a bridge circuit, and the bridge circuit controls with current such that the resistance value (heat generating temperature) is always constant despite a change of the heat radiation amount of the heater resistive element due to the air flowing around the heater resistive element. A current value from the above current control is converted to a voltage and outputted to the ECU as the sensor output signal (air flow voltage signal) $V_{out}$.

Features of the first embodiment will be described below. A detail of both the air flow sensor and the passage narrowing part 22 of the block 2 of the sensor body will be briefly described based on FIGS. 1 to 4B. In the first embodiment, as shown in FIGS. 2A to 3B, the air flow measuring device in which the sensing element 5 is directly mounted on the surface of the sensor support 3 is provided. However, as a second embodiment, an air flow measuring device, in which a sensor chip 4 is mounted on a sensor chip mounting area of a sensor support 3 and then a sensing element 5 is disposed on a surface of the sensor chip 4, will be described later. The air flow sensor, specifically the flow detecting part (the sensing element 5 composed of the heater resistive element or the air temperature sensor resistive element, for example) formed on the surface of the sensor chip 4 is located inside the passage narrowing part 22 of the block 2 (the narrowing passage 23). As shown in FIGS. 3A and 3B, front-rear surface directions (their thickness direction) of both the sensor support 3 and the sensor chip 4 are perpendicular to the flow direction of the intake air flowing in the narrowing passage 23 of the bypass passage 21, that is to say, the front-rear surface direction is directed in a passage width direction (width direction of the passage 21) of the narrowing passage 23.

The block 2 of the sensor body includes the passage narrowing part 22. Inside the passage narrowing part 22, the air flow sensor, specifically the sensing element 5 is retained. Along the bypass passage 21, the narrowing passage 23 surrounded by the passage narrowing part 22 is defined. The passage narrowing part 22, as shown in FIGS. 2A to 3B, includes two projecting walls 41 and 42 projecting from the inner wall surface of the block 2 to a center of the narrowing passage 23, and the narrowing passage 23 is defined between inner wall surfaces of the two projecting walls 41 and 42.

Figure 2A:
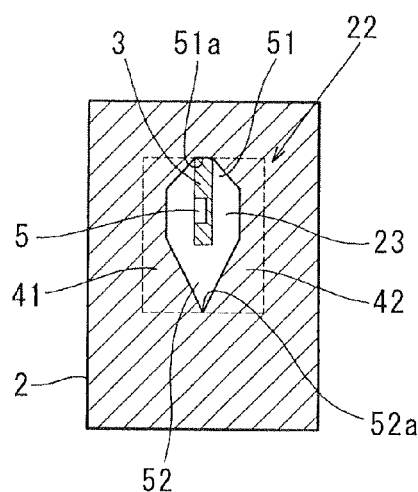
FIG. 2A is a cross-sectional view illustrating a passage narrowing part of the air flow meter taken along a line II-II of FIG. 1 in accordance with the first embodiment.
Figure 3A:
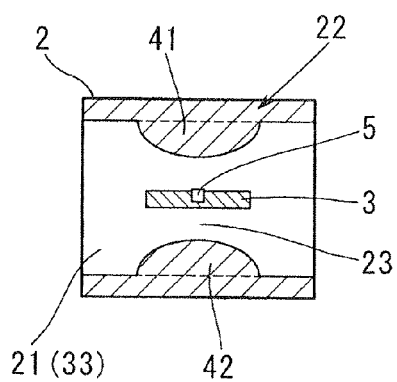
FIG. 3A is a sectional view illustrating the passage narrowing part of the air flow meter taken along a line III-III of FIG. 1 in accordance with the first embodiment.
Figure 3B:
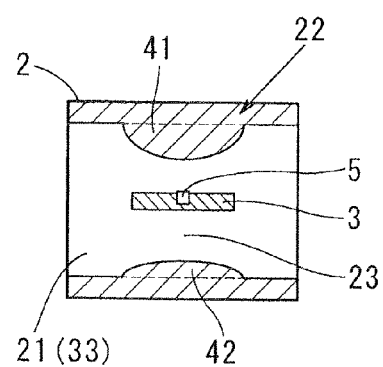
FIG. 3B is a sectional view illustrating the passage narrowing part of the air flow meter taken along the line III-III of FIG. 1 in accordance with the first embodiment.

Each inner wall surface of the two projecting walls 41 and 42 composing the passage narrowing part 22, as shown in FIG. 2A, is a flow-passage wall surface which gradually decreases (reduces) a width of the passage connecting part 33 (narrowing passage 23) of the bypass passage 21 from a center (near the air flow sensor) toward both sides of the connecting part 33 of the bypass passage 21 in a passage height direction (a height direction of the passage 21, vertical direction in FIG. 2A). The narrowing passage 23 defined between the inner wall surfaces of the two projecting walls 41 and 42 includes a narrowing passage space having a quadrangular shape in cross-section and narrowing passage spaces 51 and 52 having a triangular shape in cross-section. The quadrangle-shaped narrowing passage space is defined near the sensing element 5. The triangle-shaped narrowing passage spaces 51 and 52 are defined on both sides of the quadrangle-shaped narrowing passage space in the passage height direction of the narrowing passage 23.

The passage narrowing part 22, as shown in FIG. 2A, is configured such that, a distance from each inner wall surface of the two projecting walls 41 and 42 near the sensing element 5 to the sensing element 5 along the passage width direction of the narrowing passage 23 is shorter than a distance from width narrowest parts 51a and 52a to the sensing element 5 along the passage height direction of the narrowing passage 23. The width narrowest parts 51a and 52a are the narrowest parts of the width of the narrowing passage 23. Furthermore, the passage narrowing part 22 is configured such that a distance from the width narrowest part 51a to the sensing element 5 along the passage height direction of the narrowing passage 23 is shorter than a distance from the width narrowest part 52a to the sensing element 5 along the passage height direction of the narrowing passage 23. The passage narrowing part 22 having such a structure is provided only for the passage connecting part 33 in the bypass passage 21. The passage connecting part 33 composes the element locating part (sensor locating part) in which the air flow sensor, specifically the sensing element 5 is disposed.

As a result of the above structure, exfoliation and turbulence of the intake air flowing in the narrowing passage 23 of the bypass passage 21 can be reduced (suppressed). Thus, output fluctuation and occurrence of a measuring error of the sensing element 5 due to the exfoliation and the turbulence of an air flow can be suppressed. Moreover, reduction of a cross-sectional area (increase of flow resistance) of the narrowing passage 23 on both sides in the passage height direction of the narrowing passage 23 can be suppressed. Hence, flow velocity, when an air flow rate is low, can be maintained at a high level. That is to say, a measuring range can be expanded to a low air flow rate region more than the existing situation. Therefore, an effect of expanding the measuring range to the low air flow rate region and an effect of suppressing both the output fluctuation and the occurrence of the measuring error of the sensing element 5 are compatible, not trade-off.

Figure 2B:
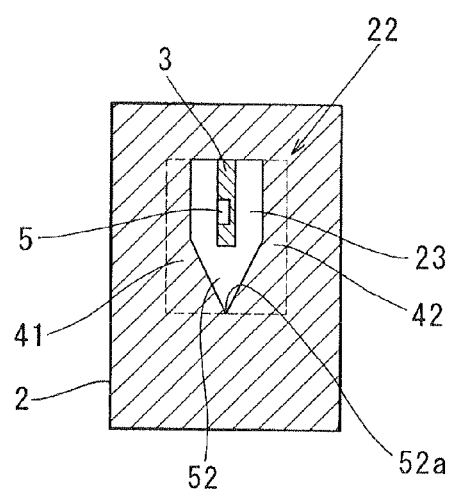
FIG. 2B is a cross-sectional view illustrating the passage narrowing part of the air flow meter taken along the line II-II of FIG. 1 in accordance with the first embodiment.

Alternatively, each inner wall surface of the two projecting walls 41 and 42 composing the passage narrowing part 22, as shown in FIG. 2B, may be a flow passage wall surface which gradually decreases (reduces) the width of the passage connecting part 33 (narrowing passage 23) of the bypass passage 21 from a center side (specifically near the sensing element 5) toward the other side of the narrowing passage 23 in the passage height direction (vertical direction in FIG. 2B) of the passage connecting part 33 of the bypass passage 21. The narrowing passage 23 defined between the inner wall surfaces of the two projecting walls 41 and 42 includes a narrowing passage space having a quadrangular shape in cross-section and a narrowing passage space 52 having a triangular shape in cross-section. The quadrangle-shaped narrowing passage space stretches from near the sensing element 5 to one side of the narrowing passage 23 in the passage height direction of the narrowing passage 23. The triangle-shaped narrowing passage space 52 is defined on the other side of the quadrangle-shaped narrowing passage space in the passage height direction of the narrowing passage 23.

The passage narrowing part 22, as shown in FIG. 2B, is configured such that a distance from each inner wall surface of the two projecting walls 41 and 42 near the sensing element 5 to the sensing element 5 along the passage width direction of the narrowing passage 23 is shorter than a distance from a width narrowest part 52a to the sensing element 5 along the passage height direction of the narrowing passage 23. The width narrowest part 52a is the narrowest part of the width of the narrowing passage 23. Furthermore, the passage narrowing part 22 is configured such that a distance from the air flow sensor to a wall surface of the block 2 (ceiling wall surface of the block 2) on one side of the narrowing passage 23 in the passage height direction of the narrowing passage 23 is shorter than a distance from the air flow sensor to a wall surface of the block 2 (width narrowest part 52a) on the other side of the narrowing passage 23 in the passage height direction of the narrowing passage 23. The wall surface of the block 2 on one side of the narrowing passage 23 in the passage height direction is formed continuously with outer circumferential wall surfaces of the curved passage parts 32 and 34. The wall surface of the block 2 on the other side of the narrowing passage 23 in the passage height direction is formed continuously with inner circumferential wall surfaces of the curved passage parts 32 and 34. In the passage narrowing part 22 illustrated in the FIG. 2B, as compare to an example illustrated in the FIG. 2A, the narrowing passage space 51 having a triangular shape in cross-section is not defined with a purpose of the expansion of the measuring range to the lower air flow region. The passage narrowing part 22 having such a structure is provided only for the passage connecting part 33 in the bypass passage 21. The passage connecting part 33 composes the element locating part (sensor locating part) in which the air flow sensor, specifically the sensing element 5 is disposed.

As a result of the above structure, a similar effect to the passage narrowing part 22 illustrated in FIG. 2A can be achieved. A defect of the exfoliation or the turbulence of a fluid flow on the inner circumferential wall surfaces of the curved passage part 32 and 34 can be prevented. Thus, the output fluctuation and the occurrence of the measuring error of the sensing element 5 due to the exfoliation and the turbulence of the fluid flow can be suppressed. Moreover, when the curved passage part 34 is on a downstream side of the passage narrowing part 22 in the flow direction of the air flowing in the narrowing passage 23, the expanding effect on the measuring range to the low air flow region can be further improved. On the outer circumferential inner wall surface of the curved passage part 34, the velocity of the air flow accelerates by inertial force, and output from the sensing element 5 is stabilized even though the narrowing passage space 51 for decreasing the flow resistance is not defined. Because the narrowing passage space 51 is not defined around a radially-outward inner wall of the curved passage part 34, an air flow rate through the passage narrowing part 22 increases. Accordingly, the measuring range can be further expanded to the low air flow region.

The passage width direction (the width direction of the passage 21) of the narrowing passage 23 of the bypass passage 21 is a front-rear surface direction (thickness direction) of the flat sensor support 3 or the flat sensor chip 4. The passage height direction (the height direction of the passage 21) of the narrowing passage 23 of the bypass passage 21 is a direction perpendicular to the front-rear surface direction (thickness direction) of the sensor support 3 or the sensor chip 4. The passage narrowing part 22 illustrated in FIG. 2A includes the cross-sectionally triangle-shaped narrowing passage spaces 51 and 52 defined on the both sides of the narrowing passage 23 in the passage height direction. The passage narrowing part 22 illustrated in FIG. 2B includes the cross-sectionally triangle-shaped narrowing passage space 52 defined on the other side of the narrowing passage 23 in the passage height direction.

As shown in FIG. 3A, inner wall surface ridge lines of the two projecting walls 41 and 42 composing the passage narrowing part 22 along the flow direction of the intake air flowing in the narrowing passage 23 are curved lines rapidly curving near the sensor support 3. Therefore, reduction of the narrowing passage 23 by the two projecting walls 41 and 42 starts from near their positions corresponding to an upstream end portion of the sensor support 3, and the reduction amount of the narrowing passage 23 is the greatest near the air flow sensor and decreases down the stream. The reduction amount of the narrowing passage 23 is zero near their positions corresponding to a downstream end portion of the sensor support 3.

In the case of the passage narrowing part 22 illustrated in FIG. 3A, shapes of the inner wall surface ridge lines of the two projecting walls 41 and 42 along the flow direction of the intake air flowing in the narrowing passage 23 are symmetrical on both a upstream side and a downstream side in the flow direction of the intake air flowing in the narrowing passage 23. Therefore, the narrowing-shaped narrowing passage 23 can align an air flow in the bypass passage 21 along a forward flow direction (from the air cleaner to the engine) or a backward flow direction (from the engine to the air cleaner) of the intake air flowing in the bypass passage 21. As a consequence of the above structure, even when turbulence of the air flow on an upstream side of the passage narrowing part 22 in the flow direction of the intake air flowing in the narrowing passage 23 is great, the output fluctuation of the sensing element 5 and the occurrence of the measuring error due to the turbulence can be suppressed. Thus, measurement accuracy can be improved.

Alternatively, as shown in FIG. 3B, the two projecting walls 41 and 42 composing the passage narrowing part 22 are configured such that a narrowing height (an amount of projection to the center of the narrowing passage 23) H1 of the projecting wall 41 on one side of the passage connecting part 33 in the passage width direction, and a narrowing height (an amount of projection to the center of the narrowing passage 23) H2 of the projecting wall 42 on the other side of the passage connecting part 33 in the passage width direction are different from each other. The two projecting walls 41 and 42 may be configured such that a narrowing height (amount of projection) of a projecting wall on one side of the narrowing passage 23 in the passage height direction, and a narrowing height (amount of projection) of a projecting wall on the other side of the narrowing passage 23 in the passage height direction are different from each other. These projection walls are not shown.

In the case of the passage narrowing part 22 illustrated in FIG. 3B, as is the case with the passage narrowing part 22 illustrated in FIG. 3A, shapes of inner wall surface ridge lines of the two projecting walls 41 and 42 along the flow direction of the intake air flowing in the narrowing passage 23 are symmetrical on both the upstream side and the downstream side in the flow direction of the intake air flowing in the narrowing passage 23. Therefore, the narrowing-shaped narrowing passage 23 can stabilize the air flow in the bypass passage 21 along the forward flow direction (from the air cleaner to the engine) or the backward flow direction (from the engine to the air cleaner) of the intake air flowing in the bypass passage 21. Owing to the above structure, even when the turbulence of the air flow on the upstream and downstream sides of the passage narrowing part 22 is great, the output fluctuation of the sensing element 5 and the occurrence of the measuring error due to the turbulence can be suppressed. Thus, the measurement accuracy can be improved. Moreover, by adjusting the narrowing heights of the two projecting walls 41 and 42, intake air pulsation characteristic of the engine can be tuned.

Second Embodiment

In the second embodiment, as illustrated in FIGS. 5A to 6B, the air flow measuring device in which the sensing element 5 is directly mounted on the surface of the sensor support 3 is drawn. But the air flow measuring device, in which the sensor chip 4 is mounted on the sensor chip mounting area of the sensor support 3 and then the sensing element 5 is disposed on the surface of the sensor chip 4, will be described as the second embodiment.

Figure 5A:
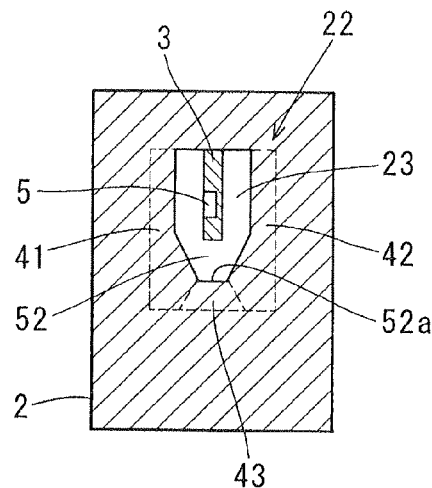
FIG. 5A is a cross-sectional view illustrating a passage narrowing part of an air flow meter in accordance with a second embodiment of the invention.

In a block 2 of a sensor body of the present embodiment, as illustrated in FIGS. 5A to 6B, the passage narrowing part 22, in which an air flow sensor is contained, is provided. Along a bypass passage 21, a narrowing passage 23 surrounded by the passage narrowing part 22 is defined. As shown in FIG. 5A, the passage narrowing part 22 includes three projecting walls 41 to 43 projecting from an inner wall surface of the block 2 to a center of the narrowing passage 23, and the narrowing passage 23 is defined between inner wall surfaces of the three projecting walls 41 to 43.

As shown in FIG. 5A, each inner wall surface of the two projecting walls 41 and 42 composing the passage narrowing part 22 is a flow-passage wall surface which gradually decreases (reduces) a width of a passage connecting part 33 (narrowing passage 23) of the bypass passage 21 from a center side (specifically near the sensing element 5) toward the other side of the narrowing passage 23 in a passage height direction of the passage connecting part 33 of the bypass passage 21. The narrowing passage 23 defined between the inner wall surfaces of the three projecting walls 41 to 43 includes a narrowing passage space having a quadrangular shape in cross-section and the narrowing passage space 52 having a trapezoidal shape in cross-section. The quadrangle-shaped narrowing passage space stretches from near the sensing element 5 to one side of the narrowing passage 23 in the passage height direction of the narrowing passage 23. The trapezoidal-shaped narrowing passage space 52 is defined on the other side of the quadrangle-shaped narrowing passage space in the passage height direction of the narrowing passage 23.

The passage narrowing part 22 illustrated in FIG. 5A is an output-fluctuation-oriented passage narrowing part which focuses further on the effect of suppressing output fluctuation of the sensing element 5 rather than the effect of expanding a measuring range to a low flow rate region. The passage narrowing part 22 has such a shape that only a sectional-area of the passage connecting part 33 is three-dimensionally reduced. The passage connecting part 33 composes an element locating part (sensor locating part). As shown in FIG. 5A, the passage narrowing part 22 is configured such that a distance from each inner wall surface of the two projecting walls 41 and 42 near the sensing element 5 to the sensing element 5 along a passage width direction of the narrowing passage 23 is shorter than a distance from a width narrowest part 52a to the sensing element 5 along the passage height direction of the narrowing passage 23. The width narrowest part 52a is the narrowest part of the width of the narrowing passage 23. Furthermore, the passage narrowing part 22 is configured such that a distance from the inner wall surface of the block 2 on a ceiling side in the passage height direction of the narrowing passage 23 to the sensing element 5 along the passage height direction of the narrowing passage 23 is shorter than a distance from the width narrowest part 52a to the sensing element 5 along the passage height direction of the narrowing passage 23. A narrowing passage space 51 is, similar to the FIG. 2B of the first embodiment, not defined at radially-outward inner walls (ceiling-side walls) of curved passage parts 32 and 34. In the case of the passage narrowing part 22 illustrated in FIG. 5A, the output fluctuation of the sensing element 5 can be further suppressed than the first embodiment. Therefore, because the output fluctuation of the sensing element 5 and occurrence of a measuring error can be further suppressed, measurement accuracy can be improved more than the first embodiment.

Figure 5B:
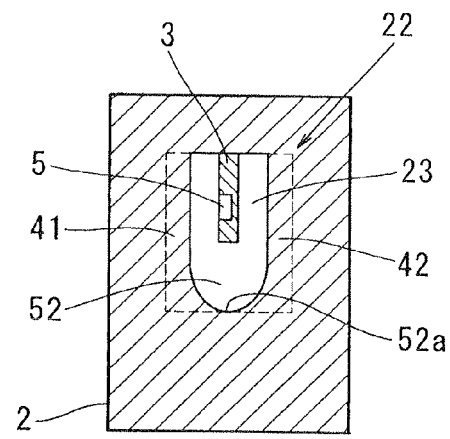
FIG. 5B is a cross-sectional view illustrating the passage narrowing part of the air flow meter in accordance with the second embodiment.

The passage narrowing part 22 illustrated in FIG. 5B is a measuring-range-oriented passage narrowing part which focuses further on the effect of expanding the measuring range to the low air flow region rather than the effect of suppressing the output fluctuation of the sensing element 5. As shown in FIG. 5B, the passage narrowing part 22 includes two projecting walls 41 and 42 projecting from the inner wall surface of the block 2 to the center of the narrowing passage 23, and the narrowing passage 23 is defined between inner wall surfaces of the two projecting walls 41 and 42. As illustrated in FIG. 5B, each inner wall surface of the two projecting walls 41 and 42 composing the passage narrowing part 22 is a flow-passage wall surface which gradually decreases (reduces) the width of the passage connecting part 33 (narrowing passage 23) of the bypass passage 21 from a center side (specifically near the sensing element 5) toward the other side of the narrowing passage 23 in the passage height direction of the passage connecting part 33 of the bypass passage 21. The narrowing passage 23 defined between the inner wall surfaces of the two projecting walls 41 and 42 includes a narrowing passage space having a quadrangular shape in cross-section and a narrowing passage space 52 having a semicircular shape in cross-section. The quadrangle-shaped narrowing passage space stretches from near the sensing element 5 to one side of the narrowing passage 23 in the passage height direction of the narrowing passage 23. The semicircle-shaped narrowing passage space 52 is defined on the other side of the quadrangle-shaped narrowing passage space in the passage height direction of the narrowing passage 23.

As shown in FIG. 5B, the passage narrowing part 22 is configured such that a distance from each inner wall surface of the two projecting walls 41 and 42 near the sensing element 5 to the sensing element 5 along the passage width direction of the narrowing passage 23 is shorter than a distance from a width narrowest part 52a to the sensing element 5 along the passage height direction of the narrowing passage 23. The width narrowest part 52a is the narrowest part of the width of the narrowing passage 23. Furthermore, the passage narrowing part 22 is configured such that a distance from the inner wall surface of the block 2 on the ceiling side to the sensing element 5 along the passage height direction of the narrowing passage 23 is shorter than a distance from the width narrowest part 52a to the sensing element 5 along the passage height direction of the narrowing passage 23. A narrowing passage space 51 is, similar to the FIG. 2B of the first embodiment, not defined at radially-outward inner wall surfaces (ceiling-side wall surfaces) of the two curved passage parts 32 and 34.

Figure 6A:
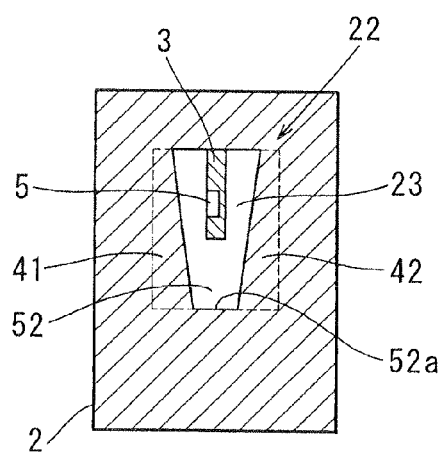
FIG. 6A is a cross-sectional view illustrating the passage narrowing part of the air flow meter in accordance with the second embodiment.
Figure 6B:
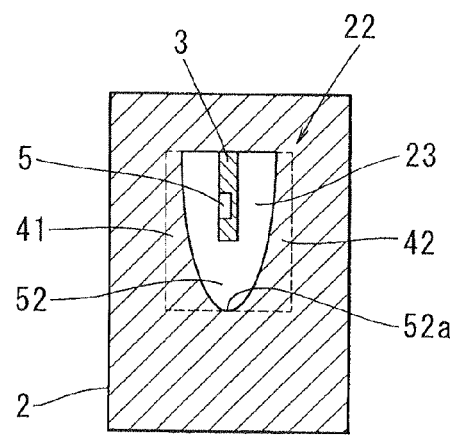
FIG. 6B is a cross-sectional view illustrating the passage narrowing part of the air flow meter in accordance with the second embodiment.

As shown in FIGS. 6A to 6B, each inner wall surface of two projecting walls 41 and 42 composing the passage narrowing part 22 is a flow-passage wall surface which gradually decreases (reduces) the width of the passage connecting part 33 (narrowing passage 23) of the bypass passage 21 from one side (ceiling side of the block 2) toward the other side (bottom side of the block 2) of the narrowing passage 23 in the passage height direction of the passage connecting part 33 of the bypass passage 21. A narrowing passage space 51 is, similar to the FIG. 2B of the first embodiment, not defined at radially-outward inner wall surfaces (ceiling-side wall surfaces) of the two curved passage parts 32 and 34. By virtue of the above structure, a similar effect to the passage narrowing part 22 illustrated in FIG. 2B can be achieved. The passage narrowing part 22 illustrated in FIGS. 5A to 6B is, similar to the first embodiment, provided only for the passage connecting part 33 in the bypass passage 21. The passage connecting part 33 composes the element locating part (sensor locating part) in which the air flow sensor, specifically the sensing element 5 is disposed.

Third Embodiment

FIGS. 7A to 8B show a third embodiment of the invention. In the third embodiment, as illustrated in FIGS. 7A to 8B, an air flow measuring device in which a sensing element 5 is directly mounted on a surface of a sensor support 3 is drawn. But the air flow measuring device, in which a sensor chip 4 is mounted on a sensor chip mounting area of the sensor support 3 and then the sensing element 5 is disposed on the surface of the sensor chip 4, will be described as the third embodiment.

In a block 2 of a sensor body of the present embodiment, as illustrated in FIGS. 7A to 8B, the passage narrowing part 22, in which an air flow sensor is contained, is provided. Along a bypass passage 21, a narrowing passage 23 surrounded by the passage narrowing part 22 is defined. As shown in FIGS. 7A to 8B, the passage narrowing part 22 includes at least two projecting walls 41 and 42 projecting from an inner wall surface of the block 2 to a center of the narrowing passage 23, and the narrowing passage 23 is defined between inner wall surfaces of the at least two projecting walls 41 and 42.

Figure 7A:
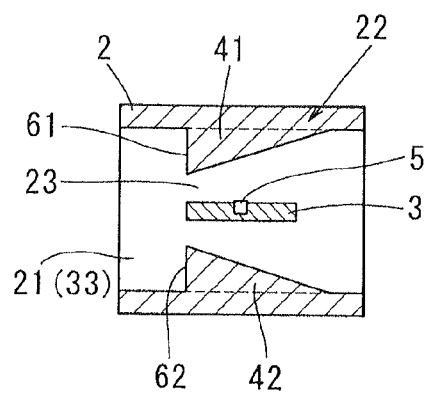
FIG. 7A is a longitudinal sectional view illustrating a passage narrowing part of an air flow meter in accordance with a third embodiment of the invention.

As shown in FIG. 7A, thicknesses of the two projecting walls 41 and 42 composing the passage narrowing part 22 are thin on an inlet side of the passage narrowing part 22 and gradually become thicker toward an opposite side (outlet side) of the passage narrowing part 22 from the intake side. Therefore, ridge lines of inner wall surfaces of the two projecting walls 41 and 42 are inclined linearly so as to gradually reduce a width of the narrowing passage 23 along a flow direction of intake air flowing in the bypass passage 21.

The two projecting walls 41 and 42 start the passage area reduction to align the air flow from an inlet position of the passage narrowing part 22. Hence, a starting position of the passage reduction for air flow alignment corresponds to a position of an upstream end portion of the sensor support 3, and an end position of the passage reduction for air flow alignment corresponds to a position of a downstream end portion of the sensor support 3. The passage narrowing part 22 at the end portion of the passage reduction for air flow alignment is shaped such that a backward air flow dose not easily flow into upstream side of the end portion of the sensor support 3 in the flow direction of the intake air flowing in the bypass passage 21 (such that the passage area reduction amount is zero). Therefore, on downstream end surfaces of the two projecting walls 41 and 42, step difference surfaces 61 and 62, which are parallel to a direction perpendicular to the flow direction of the intake air flowing in the bypass passage 21, are formed. By the above structure, when the air flow sensor is a backward-flow undetectable sensor, the air flow meter (AFM) having the passage narrowing part 22 illustrated in FIG. 7a can be used.

Figure 7B:
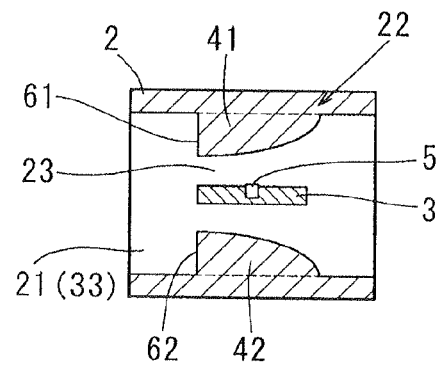
FIG. 7B is a longitudinal sectional view illustrating the passage narrowing part of the air flow meter in accordance with the third embodiment.

In the passage narrowing part 22 illustrated in FIG. 7B, unlike FIG. 7A, ridge lines of inner wall surfaces of the two projecting walls 41 and 42 along the air flow direction change in a curved manner, but the other structure of the passage narrowing part 22 is identical to FIG. 7A. By adopting the structure illustrated in FIG. 7B depending on a specification of the AFM, output fluctuation of the sensing element 5 and occurrence of a measuring error due to turbulence of the intake air flowing into the bypass passage 21 can be suppressed. Thus, accuracy of air flow measurement by the AFM can be improved.

Figure 8A:
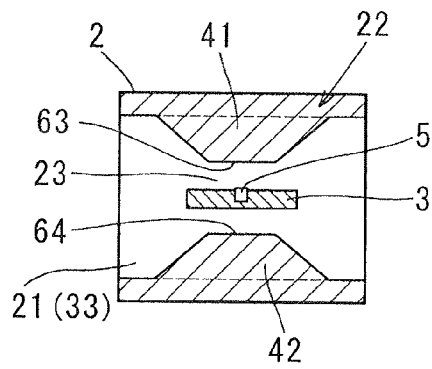
FIG. 8A is a longitudinal sectional view illustrating the passage narrowing part of the air flow meter in accordance with the third embodiment.

As shown in FIG. 8A, in the passage narrowing part 22, the two projecting walls 41 and 42 have symmetrical shapes, and their cross-sectional shapes are trapezoidal. Inner wall surface ridge lines of the two projecting walls 41 and 42 are inclined linearly near the upstream end portion of the sensor support 3 to gradually decrease a width of the narrowing passage 23 along the flow direction of the intake air flowing in the bypass passage 21. Near the downstream end portion of the sensor support 3, the ridge lines are inclined linearly to gradually expand the width of the narrowing passage 23 along the flow direction of intake air flowing through the bypass passage 21. Accordingly, inclined parts are formed on both sides of the two projecting walls 41 and 42. Moreover, the two projecting walls 41 and 42 include straight line parts 63 and 64 which linearly connect together width narrowest parts of the inclined parts of the two projecting walls 41 and 42 on both sides of the straight line parts 63 and 64 respectively in the middle of the sensor support 3 (in the middle of the narrowing passage 23).

The air flow measuring device, in which a mounting position of the air flow sensor of the sensor support 3 corresponds to the most passage reduced position of the passage narrowing part 22, has the highest effect reducing exfoliation and the turbulence of the air flow, and the output fluctuation of the sensing element 5 can be reduced. Accordingly, if a gap between the mounting position of the air flow sensor of the sensor support 3 and the most passage-reduced position of the passage narrowing part 22 is large, output variability between individuals of the AFM becomes wide. However, in the passage narrowing part 22 illustrated in FIG. 8A, by forming the straight line parts 63 and 64 having a certain passage are reduction amount in the middle of the two projecting walls 41 and 42 composing the passage narrowing part 22, the output variability between individuals can be reduced when mass producing the AFM.

Figure 8B:
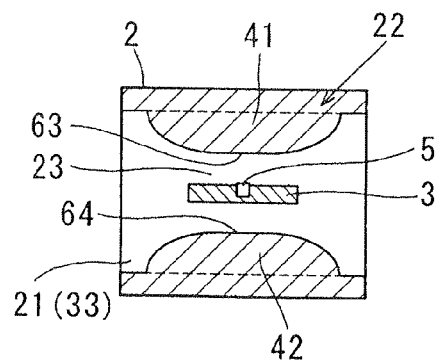
FIG. 8B is a longitudinal sectional view illustrating the passage narrowing part of the air flow meter in accordance with the third embodiment.

As shown in FIG. 8B, in the passage narrowing part 22, ridge lines of inner wall surfaces of the two projecting walls 41 and 42 along the flow direction of air are curved lines that change rapidly adjacent to the sensor support 3. The passage area reduction for air flow alignment by the two projecting walls 41 and 42 starts from near their position corresponding to the upstream end portion of the sensor support 3, and the passage area reduction amount is the greatest near the air flow sensor and decreases down the stream. The passage are reduction amount is zero near positions the two projecting walls 41 and 42 corresponding to a downstream end portion of the sensor support 3. Because of the above structure, even when the turbulence of the air flow on an upstream side of the passage narrowing part 22 is great, the output fluctuation of the sensing element 5 and the occurrence of the measuring error due to the turbulence can be suppressed. Thus, accuracy of air flow measurement by the AFM can be improved.

In the passage narrowing part 22 illustrated in FIG. 8B, ridge lines of inner wall surfaces of the two projecting walls 41 and 42 on upstream and downstream sides of the two projecting walls 41 and 42 in the air flow direction are curved lines similar to FIG. 3A, but narrowing heights of the two projecting walls 41 and 42 are constant from the upstream end portion to the downstream end portion of the sensor support 3. The projecting walls 41 and 42 gradually decrease the passage area reduction from their positions corresponding to the downstream end portion of the sensor support 3 down the stream. As a result of the passage narrowing part 22 illustrated in FIG. 8B, the cross-sectional area of the narrowing passage 23 is constant near the air flow sensor. Hence, the cross-sectional area immediately downstream of the air flow sensor is not expanded. Therefore, even if the air flow sensor having high response sensitivity is used, the output fluctuation of the sensing element 5 and the occurrence of the measuring error can be suppressed. Thus, the accuracy of the air flow measurement by the AFM can be improved. As is the case with the first embodiment, the passage narrowing part 22 illustrated in FIGS. 7A to 8B is provided only for a passage connecting part 33 in the bypass passage 21. The passage connecting part 33 composes an element locating part (sensor locating part) in which the air flow sensor, specifically the sensing element 5 is disposed.

Modification

In the embodiments, the flow measuring device of the invention is applied to the air flow measuring device for detecting the flow rate or the flow direction of the intake air supplied to the combustion chamber of the internal combustion (engine). However, the flow measuring device of the invention may be applied to a flow measuring device for detecting a flow rate of fluid, for example, gas fuel or liquid fuel supplied to a combustion chamber of an internal combustion (engine) or gas supplied to a gas apparatus. Moreover, the air temperature sensor resistive element is disposed on a place where surrounding air temperature can be detected without thermal influence of the heater resistive element, but the air temperature sensor resistive element may be disposed on the membrane of the sensor chip 4 to be located downstream side or both upstream and downstream sides of the heater resistive element for detecting a temperature distribution generated by heat of the heater resistive element.

In the embodiments, for the flow measurement element, the heat generating resistive element (heater resistive element) and the thermosensing resistive element (temperature sensor resistive element) are used. The heater resistive element is formed in a predetermined pattern on the surface of the silicon substrate. However, for the flow measurement element, a heat generating resistive element (heater resistive element) and a thermosensing resistive element (temperature sensor resistive element), which are composed of a cylindrically-shaped bobbin, a pair of lead wires inserted into both ends of the bobbin, a resistance wire wound around a circumference of the bobbin and connected to the lead wire, and a protection film for protecting the resistance wire and the lead wire, may be used. Moreover, depending on the specification of the air flow meter (AFM) (specification of the air flow sensor), which is the air flow measuring device, a cross-sectional structure of the passage narrowing part 22 illustrated in FIGS. 2A, 2B, and 5A to 6B and a longitudinal sectional structure of the passage narrowing part 22 illustrated in FIGS. 3A, 3B, and 7A to 8B may be arbitrarily (freely) combined.

Figure 9:
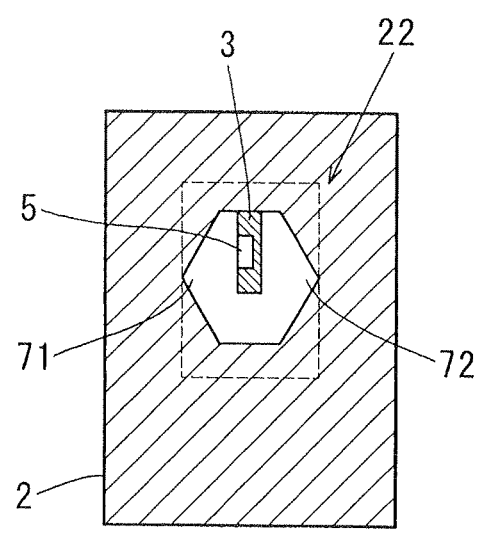
FIG. 9 is a cross-sectional view illustrating a passage narrowing, part of an air flow meter taken along the line II-II of FIG. 1 in accordance with a first modification.
Figure 10:
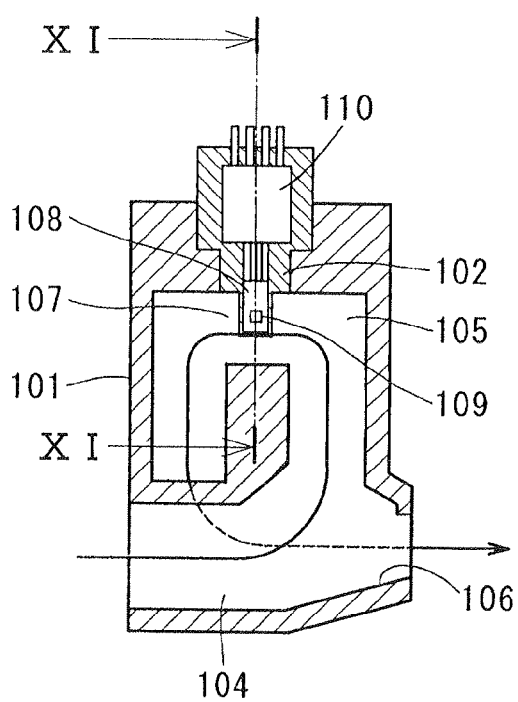
FIG. 10 is a sectional view illustrating an air flow meter in accordance with a conventional technology.
Figure 11A:
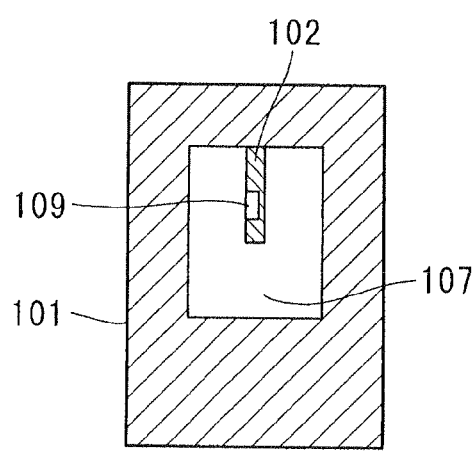
FIG. 11A is a sectional view of a passage narrowing part of the air flow meter taken along a line XI-XI of FIG. 10 in accordance with the conventional technology.
Figure 11B:
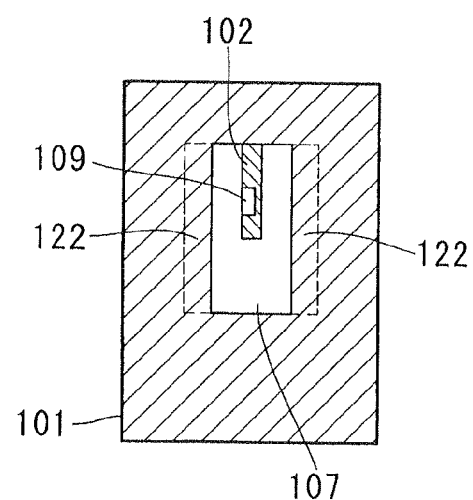
FIG. 11B is a sectional view of the passage narrowing part of the air flow meter taken along the line XI-XI of FIG. 10 in accordance with the conventional technology.
Figure 12A:
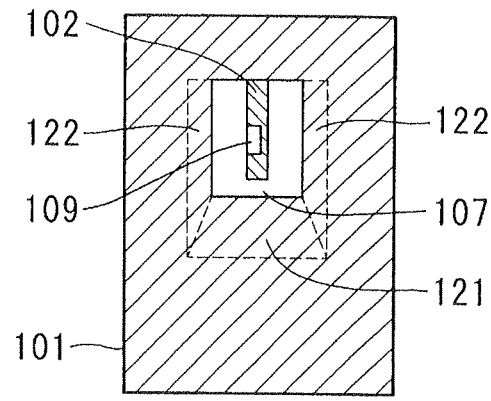
FIG. 12A is a sectional view of the passage narrowing part of the air flow meter taken along the line XI-XI of FIG. 10 in accordance with the conventional technology.
Figure 12B:
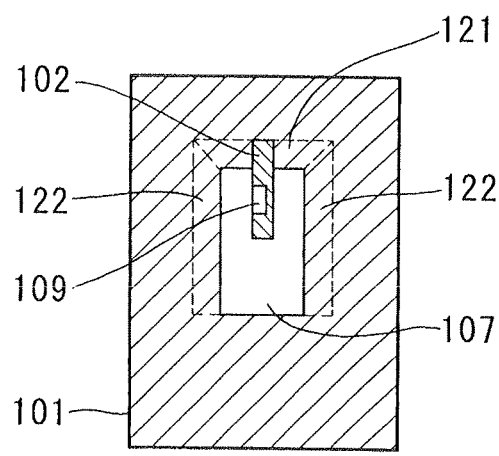
FIG. 12B is a sectional view of the passage narrowing part of the air flow meter taken along the line XI-XI of FIG. 10 in accordance with the conventional technology.
Figure 12C:
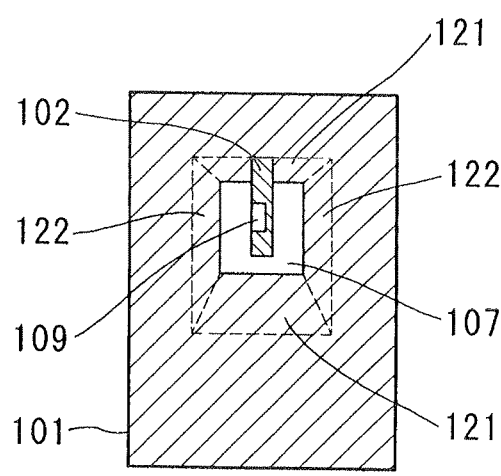
FIG. 12C is a sectional view of the passage narrowing part of the air flow meter taken along the line XI-XI of FIG. 10 in accordance with the conventional technology.

In the embodiments, the distance from the inner wall surface of the passage narrowing part 22 near the sensing element 5 (flow measurement element) to the sensing element 5 along the width direction of the bypass passage 21 (narrowing passage 23) is configured to be shorter than the distance from the width narrowest part 51*a* (52*a*), where the width of the narrowing passage 23 is the narrowest, to the sensing element 5 along the height direction of the narrowing passage 23. However, the distance from the width narrowest part 51*a* (52*a*), where the width of the narrowing passage 23 is the narrowest, to the sensing element 5 along the height direction of the narrowing passage 23 may be shorter than the distance from the inner wall surface of the passage narrowing part 22 near the flow measurement element 5 to the flow measurement element 5 along the width direction of the narrowing passage 23. As shown in FIG. 9, a passage narrowing part 22, which include an inner wall gradually decreasing the width of the bypass passage 21 from the center side of the bypass passage 21 toward both sides of the bypass passage 21 in its height direction, may be formed. In the passage narrowing part 22, as illustrated in FIG. 9, narrowing passage spaces 71 and 72 having triangular shapes in cross-section are defined on both sides of the sensor support 3 and the sensor chip 4 in their front-rear surface direction (thickness direction).

To sum up, the flow measuring device of the above embodiments may be described as follows.

The flow measuring device includes the housing, the platy support 3, and the flow measurement element 5. Inside the housing, the passage 21, through which fluid (fluid to be measured, such as air) flows, is defined. The support 3 is disposed along a flow direction of the fluid flowing in the passage 21. For example, the support 3 is disposed such that the front-rear surfaces of the support 3 are parallel to the flow direction of the fluid flowing in the passage 21. The flow measurement element 5 is a flow detection element which detects (measures) a flow rate (flow velocity or flow direction) of the fluid flowing in the passage 21. The flow measurement element 5 is disposed (formed) on the surface of the support 3.

The passage narrowing part 22, which reduces (narrows) the cross-sectional area of the passage 21, is provided for the predetermined section (e.g., only for a section of the passage 21 adjacent to the locating part, in which the flow measurement element 5 is located) of the passage 21 in the housing (or the passage 21). Inside the passage narrowing part 22, the flow measurement element 5 is located. As the inner wall surface of the passage narrowing part 22, an inner wall surface which gradually reduces the width of the passage 21 from the center side of the passage 21 to both sides of the passage 21 in the height direction of the passage 21 is provided. Therefore, the effect of suppressing the occurrence of the measurement error and the fluctuation of the output from the flow measurement element 5, and the effect of expanding the measurement range to the low flow rate region can be compatible, not trade-off.

Alternatively, as the inner wall surface of the passage narrowing part 22, an inner wall surface which gradually reduces the width of the passage 21 from the center side or one side of the passage 21 to the other side of the passage 21 in the height direction of the passage 21 may be provided.

The distance between the inner wall surface of the passage narrowing part 22 near the flow measurement element 5 and the flow measurement element 5 along the width direction of the passage 21 is smaller than the distance between a width narrowest part 51*a* or 52*a* and the flow measurement element 5 along the height direction of the passage 21. The width narrowest part 51*a* or 52*a* has the narrowest width of the passage 21. Thus, the exfoliation or the turbulence of the fluid flowing in the passage 21 can be reduced (alleviated). Therefore, the occurrence of the output fluctuation and the measurement error of the flow measurement element due to the exfoliation or the turbulence of the fluid can be suppressed. Furthermore, as a result of the above-described structure of the passage narrowing part 22, reduction of the cross-sectional area of the passage 21 (increase of flow resistance) can be suppressed. Hence, flow velocity, when the air flow rate is low, can be ensured at a high level. That is to say, the measuring range can be expanded to the low air flow rate region more than the existing situation. Accordingly, the effect of expanding the measuring range to the low air flow rate region and the effect of suppressing both the output fluctuation of the flow measurement element 5 and the occurrence of the measuring error of the flow measurement element 5 can be compatible, not trade-off. The width direction of the passage 21 may be the front-rear surface direction (thickness direction) of the support 3. The height direction of the passage 21 may be perpendicular to the front-rear surface direction (thickness direction) of the support 3.

The housing (or the passage 21) includes the curved passage part 32 or 34, which perpendicularly bends the flow direction of the fluid, on the upstream or downstream side of the passage narrowing part 22 in the flow direction of the fluid. In the passage narrowing part 22, the distance between the flow measurement element 5 and the wall surface on one side of the passage 21 along the height direction of the passage 21 is smaller than the distance between the flow measurement element 5 and the wall surface on the other side of the passage 21 along the height direction of the passage 21. The wall surface on the one side of the passage 21 is continuous with the outer circumferential wall surface of the curved passage part 32 or 34. The wall surface on the other side of the passage 21 is continuous with the inner circumferential wall surface of the curved passage part 32 or 34. Hence, the defect of the exfoliation or the turbulence of the fluid flow on the inner circumferential wall surface of the curved passage part 32 or 34 can be prevented. Thus, the output fluctuation and the occurrence of the measuring error of the flow measurement element 5 due to the exfoliation and the turbulence of the fluid flow can be suppressed. Moreover, when the curved passage part 34 is on the downstream side of the passage narrowing part 22 in the flow direction of the fluid, the effect of expanding the measuring range to the low air flow region can be further improved. On the outer circumferential wall surface of the curved passage part 34, the velocity of the fluid accelerates by inertial force, and the output from the sensing element 5 is stabilized even though the narrowing passage space 51, which decreases the flow resistance, is not defined. Because the narrowing passage space 51 is not defined around the radially-outward inner wall of the curved passage part 34, a fluid volume through the passage narrowing part 22 increases. Accordingly, the measuring range can be further expanded to the low air flow region.

The passage narrowing part 22, which reduces (narrows) the cross-sectional area of the passage 21, is provided only near the locating part of the passage 21. In the locating part, the flow measurement element 5 is located. Accordingly, the effect of suppressing the occurrence of the measurement error and the fluctuation of the output from the flow measurement element 5, and the effect of expanding the measurement range to the low flow rate region can be compatible. By defining the narrowing passage space 51a or 52a, which have a triangular shape in cross-section, on both sides or the other side of the passage 21 in the height direction of the passage 21, the reduction of the cross-sectional area of the passage 21 (the increase of the fluid resistance) can be suppressed. Thus, flow velocity, when the air flow rate is low, can be maintained at a high level. That is to say, the measuring range can be expanded to the low air flow rate region more than the existing situation.

Alternatively, the narrowing passage space 51a or 52a having a trapezoidal or semicircular shape in cross section may be defined on both sides or the other side of the passage 21 in the height direction of the passage 21.

The passage narrowing part 22 has a narrowing-shape which can align the fluid flowing in the passage 21 along the forward flow direction or the backward flow direction. Thus, the exfoliation or the turbulence of a flow of the fluid flowing in the passage 21 can be reduced (suppressed). Therefore, the occurrence of the output fluctuation and the measurement error of the flow measurement element 5 due to the exfoliation or the turbulence of the fluid flow can be suppressed. The passage narrowing part 22 can be applied to a flow measurement device including a flow measurement element 5 which can detect both forward and backward fluid flows. Instead, the passage narrowing part 22 may have a narrowing-shape which can align the fluid flowing in the passage 21 only along the forward flow direction. In this case, the passage narrowing part 22 can be applied to a flow measurement device including a flow measurement element 5 which can detect only the forward fluid flow.

The ridge line of the wall surface of the passage narrowing part 22 is the curved or straight line so as to gradually reduce the width of the passage 21 in the flow direction of the fluid flowing in the passage 21. Hence, the occurrence of the output fluctuation and the measurement error of the flow measurement element 5 due to the exfoliation or the turbulence of a flow the fluid flowing in the passage narrowing part 22 can be suppressed. Therefore, the accuracy of the measurement of the flow measuring device can be improved. Alternatively, the straight line part 63 or 64, by which the width of the passage 21 is maintained at a constant length, may be provided near the flow measurement element 5 of the passage narrowing part 22. The flow measurement element 5 disposed on the surface of the support 3 is composed of the flat-plate substrate parallel to the flow direction of the fluid flowing in the passage 21 and the resistive element formed on the surface of the substrate. For example, the resistive element is the thin-film resistive element (includes at least one heat generating resistive element) formed in a predetermined pattern on the surface of the substrate.

Additional advantages and modifications will readily occur to those skilled in the art. The invention in its broader terms is therefore not limited to the specific details, representative apparatus, and illustrative examples shown and described.

What is claimed is:

1. A flow measuring device comprising:
   a housing defining a passage therein and including a passage narrowing part, which reduces a cross-sectional area of the passage, in a predetermined part of the passage;
   a support having a platy shape and disposed along a flow direction of fluid flowing in the passage; and
   a flow measurement element which is located inside the passage narrowing part and disposed on a surface of the support, the flow measurement element being configured to detect a flow rate of fluid flowing in the passage, wherein the passage narrowing part has an inner wall surface that gradually reduces a width of the passage from a center side to both end sides of the passage in a height direction of the passage, which is perpendicular to a direction of the width of the passage.

2. The flow measuring device according to claim 1, wherein:
   the passage narrowing part is formed such that a distance between the inner wall surface of the passage narrowing part adjacent to the flow measurement element and the flow measurement element along the direction of the width of the passage is smaller than a distance between a first width narrowest part of the inner wall surface at one of the both end sides of the passage and the flow measurement element along the height direction of the passage, and than a distance between a second width narrowest part of the inner wall surface at the other one of the both end sides of the passage and the flow measurement element along the height direction of the passage;

the first width narrowest part has the narrowest width of the passage within a first range between the center side and the one of the both end sides of the passage; and the second width narrowest part has the narrowest width of the passage within a second range between the center side and the other one of the both end sides of the passage.

3. The flow measuring device according to claim 2, wherein the direction of the width of the passage is a thickness direction of the support having the platy shape.

4. The flow measuring device according to claim 1, wherein the height direction of the passage is a direction perpendicular to a thickness direction of the support having the platy shape.

5. The flow measuring device according to claim 1, wherein:

the housing further includes a curved passage part, which defines the passage, on an upstream side or a downstream side of the passage narrowing part in the flow direction of fluid;

the curved passage part changes the flow direction of fluid perpendicularly; and the passage narrowing part is formed such that:

the passage narrowing part includes one inner wall surface and the other inner wall surface, which define the passage and are opposed to each other in the height direction of the passage;

the one inner wall surface of the passage narrowing part is formed continuously with a radially outward part of an inner wall surface of the curved passage part;

the other inner wall surface of the passage narrowing part is formed continuously with a radially inward part of the inner wall surface of the curved passage part; and a distance from the flow measurement element to the other inner wall surface of the passage narrowing part in the height direction of the passage is larger than a distance from the flow measurement element to the one inner wall surface of the passage narrowing part in the height direction of the passage.

6. The flow measuring device according to claim 1, wherein the passage narrowing part defines only an element disposing part of the passage in which the flow measurement element is disposed.

7. The flow measuring device according to claim 1, wherein the passage narrowing part defines a narrowing passage space having a triangular shape in cross-section on the both end sides or one side of the passage in the height direction of the passage.

8. The flow measuring device according to claim 1, wherein the passage narrowing part defines a narrowing passage space having a trapezoidal shape in cross-section on the both end sides or one side of the passage in the height direction of the passage.

9. The flow measuring device according to claim 1, wherein the passage narrowing part defines a narrowing passage space having a semicircular shape in cross-section on the both end sides or one side of the passage in the height direction of the passage.

10. The flow measuring device according to claim 1, wherein the passage narrowing part is formed in a narrowing shape which is capable of aligning a flow of fluid flowing in the passage along a forward direction or a backward direction of the flow of fluid.

11. The flow measuring device according to claim 1, wherein the passage narrowing part is formed in a narrowing shape which is capable of aligning a flow of fluid flowing in the passage only along a forward direction of the flow of fluid.

12. The flow measuring device according to claim 1, wherein a ridge line of the inner wall surface of the passage narrowing part, which gradually reduces the width of the passage in the flow direction of fluid flowing in the passage, is formed in a curved or linear manner.

13. The flow measuring device according to claim 1, wherein:

the inner wall surface of the passage narrowing part includes a straight line part near the flow measuring element; and the straight line part maintains the width of the passage to be constant along the flow direction of fluid in the passage.

14. The flow measuring device according to claim 1, wherein the flow measuring element includes a flat-plate substrate parallel to the flow direction of fluid flowing in the passage, and a resistive element formed on a surface of the substrate.

15. A flow measuring device comprising:

a housing defining a passage therein and including a passage narrowing part, which reduces a cross-sectional area of the passage, in a predetermined part of the passage;

a support having a platy shape and disposed along a flow direction of fluid flowing in the passage; and a flow measurement element which is located inside the passage narrowing part and disposed on a surface of the support, the flow measurement element being configured to detect a flow rate of fluid flowing in the passage, wherein the passage narrowing part has an inner wall surface that gradually reduces a width of the passage in one of:

a direction from a center side to an end side of the passage along a height direction of the passage, which is perpendicular to a direction of the width of the passage; and a direction from one end side to the other end side of the passage along the height direction of the passage.

16. The flow measuring device according to claim 15, wherein:

the passage narrowing part is formed such that a distance between the inner wall surface of the passage narrowing part adjacent to the flow measurement element and the flow measurement element along the direction of the width of the passage is smaller than a distance between a width narrowest part of the inner wall surface and the flow measurement element along the height direction of the passage; and the width narrowest part has the narrowest width of the passage.

17. The flow measuring device according to claim 16, wherein the direction of the width of the passage is a thickness direction of the support having the platy shape.

18. The flow measuring device according to claim 15, wherein the height direction of the passage is a direction perpendicular to a thickness direction of the support having the platy shape.

19. The flow measuring device according to claim 15, wherein:
- the housing further includes a curved passage part, which defines the passage, on an upstream side or a downstream side of the passage narrowing part in the flow direction of fluid;
- the curved passage part changes the flow direction of fluid perpendicularly; and
- the passage narrowing part is formed such that:
  - the passage narrowing part includes one inner wall surface and the other inner wall surface, which define the passage and are opposed to each other in the height direction of the passage, the other inner wall surface including a width narrowest part of the inner wall surface which has the narrowest width of the passage;
  - the one inner wall surface of the passage narrowing part is formed continuously with a radially outward part of an inner wall surface of the curved passage part;
  - the other inner wall surface of the passage narrowing part is formed continuously with a radially inward part of the inner wall surface of the curved passage part; and
  - a distance from the flow measurement element to the other inner wall surface of the passage narrowing part in the height direction of the passage is larger than a distance from the flow measurement element to the one inner wall surface of the passage narrowing part in the height direction of the passage.

20. The flow measuring device according to claim 15, wherein the passage narrowing part defines only an element disposing part of the passage in which the flow measurement element is disposed.

21. The flow measuring device according to claim 15, wherein the passage narrowing part defines a narrowing passage space having a triangular shape in cross-section on one side of the passage in the height direction of the passage, on which a width narrowest part of the inner wall surface having the narrowest width of the passage is located.

22. The flow measuring device according to claim 15, wherein the passage narrowing part defines a narrowing passage space having a trapezoidal shape in cross-section on both sides or one side of the passage in the height direction of the passage, a width narrowest part of the inner wall surface having the narrowest width of the passage being located on the one side of the passage.

23. The flow measuring device according to claim 15, wherein the passage narrowing part defines a narrowing passage space having a semicircular shape in cross-section on one side of the passage in the height direction of the passage, on which a width narrowest part of the inner wall surface having the narrowest width of the passage is located.

24. The flow measuring device according to claim 15, wherein the passage narrowing part is formed in a narrowing shape which is capable of aligning a flow of fluid flowing in the passage along a forward direction or a backward direction of the flow of fluid.

25. The flow measuring device according to claim 15, wherein the passage narrowing part is formed in a narrowing shape which is capable of aligning a flow of fluid flowing in the passage only along a forward direction of the flow of fluid.

26. The flow measuring device according to claim 15, wherein a ridge line of the inner wall surface of the passage narrowing part, which gradually reduces the width of the passage in the flow direction of fluid flowing in the passage, is formed in a curved or linear manner.

27. The flow measuring device according to claim 15, wherein:
- the inner wall surface of the passage narrowing part includes a straight line part near the flow measuring element; and
- the straight line part maintains the width of the passage to be constant along the flow direction of fluid in the passage.

28. The flow measuring device according to claim 15, wherein the flow measuring element includes a flat-plate substrate parallel to the flow direction of fluid flowing in the passage, and a resistive element formed on a surface of the substrate.

* * * * *